United States Patent [19]

Malone

[11] 4,055,533

[45] Oct. 25, 1977

[54] POTTERY-LIKE COATING COMPOSITION

[76] Inventor: Laurence A. Malone, 2111 Jefferson Davis Highway, Arlington, Va. 22202

[21] Appl. No.: 784,845

[22] Filed: Apr. 5, 1977

Related U.S. Application Data

[63] Continuation-in-part of Ser. No. 672,068, March 30, 1976, abandoned.

[51] Int. Cl.$^2$ ............................................. C08L 63/02
[52] U.S. Cl. .......................... 260/37 EP; 260/830 TW
[58] Field of Search .................... 260/37 EP, 830 TW

[56] References Cited

U.S. PATENT DOCUMENTS

| | | | |
|---|---|---|---|
| 2,847,341 | 8/1958 | Kohn | 260/37 EP |
| 3,769,070 | 10/1973 | Schilt | 260/37 EP |
| 3,876,606 | 4/1975 | Kehr | 260/37 EP |

OTHER PUBLICATIONS

Lee et al.; *Handbook of Epoxy Resins*; McGraw-Hill; 1967 pp. 4–66.

*Primary Examiner*—Lewis T. Jacobs
*Attorney, Agent, or Firm*—Larson, Taylor and Hinds

[57] ABSTRACT

Disclosed herein is a composition comprising a first component and from 30 to 70 percent by volume of a second component, which hardens into a pottery-like substance when the two components are mixed together. No firing is required and the composition has suitable pot life to permit application by brush or by hand. Further, the composition may be mixed with oil base paint, tinted with oil base colors, and applied as a finish coating to stone, pottery and porcelain ceramics. The composition is adhesive, air-drying and self-curing. The first component includes EPON 828 epoxy resin, EPON 834 epoxy resin, hexachlorobutadiene, calcium carbonate, titanium dioxide, barium sulphate, zinc oxide, white lead, NUJOL and acetic acid. The second component includes EPON V-15, a polyamide resin which is used as a curing agent, calcium carbonate, epichlorohydrin, bisphenol-A and various polyamides, such as aminophenol, diacetamide, amido-aldehyde and dimethylacetanilide.

3 Claims, No Drawings

POTTERY-LIKE COATING COMPOSITION

This is a continuation-in-part of application Ser. No. 672,068, filed Mar. 30, 1976, and now abandoned.

FIELD OF THE INVENTION

The invention relates to a pottery-like composition comprising a unique combination of epoxy-resins, curing agents, and other chemicals resulting in a ceramic coating. In particular, it relates to a coating composition which is curable at room temperature and is effective in the mending and restoring of pottery and pottery-like ceramics, as it provides a structural surface for an extended period of time.

BACKGROUND OF THE INVENTION

Pottery is made of clay without kaolin. Kaolin is essential to making porcelain (china), but is not essential nor is it used in making pottery. Pottery is an earthenware and very different in structure from porcelain. Pottery is hardened by heat and is made of a mixture of coarse clay, which produces the rough texture from which it gets its common name. Basically, pottery is a pliable earthen clay, not containing kaolin, and is therefore easily molded, shaped, fired, and hardened for commercial use. The epoxy-resinous composition described herein looks like and hardens to the rough consistency of pottery and may be used for filling and mending missing pieces, as well as for producing a bisque finish or structural coating. The composition described herein is excellent for restoring and finishing soft paste pottery referred to as faience or majolica.

A great need exists for a mending and restoring material externally identical or interchangeable with pottery and similar ceramics such as faience, majolica, soft paste ware, which requires no kiln or firing and which is hardenable thermo-genetically, air-drying, and self-curing, and which may be applied with a brush or by hand. Such material is essentially useful for pottery repair and coating finishes stone-like in nature, and as a coating material to fashion identical finishes over broken areas of an existing pottery or ceramic article. The material should harden without being subjected to high temperatures and could be used with considerable convenience and efficiency to repair or modify ceramics, pottery, decorated by paint or otherwise and materials which would normally be destroyed by subjection to high temperatures or re-firing. The material desirably could exhibit a small coefficient of expansion, matching that of pottery. The material composition desirably could withstand high temperatures to which a chinalike object may be subjected in use, such as when being cleaned in a dishwasher. Once cured, the material should be impervious to hot or cold water, acids, stains, saline solutions and the like.

It is an object of the present invention to provide a material which is capable, without firing, of hardening into a hard and pottery-like coating substance.

It is an object of this invention to provide a conveniently hardenable coating compound which is sufficiently strong and exhibits the lustrous or the bisque finish or stoneware ceramics and pottery.

It is similarly an object of this invention to provide a composition which sets to a structurally hard coating, mortar-like in its consistency and adhesiveness, which may be substantially externally indistinguishable from the ceramic to which it is applied.

It is another object of this invention to provide a coating compound which hardens to a rigid bond substantially impervious to water and to changes of temperature.

It is another object of this invention to provide a ceramic coating or mortar which is thermogenetic, and which hardens without heating or baking, fairly rapidly.

It is similarly an object of this invention to provide a composition which can be mixed with oil base paints to enable a ceramist or china-mender to simulate and restore the ceramic article he is mending, in such a manner that the bisque or stoneware surface of the article is restored to perfection and the damage is invisibilised.

It is another object of this invention to provide an adhesive structural pottery-like coating composition which readily hardens at room temperatures.

It is another object of this invention to provide a coating composition having a low coefficient of expansion similar to that of pottery or stoneware.

It is another object of this invention to provide materials for the repair, modification and resurfacing of pottery and the like without heating of any kind and without high temperature treatment.

SUMMARY OF THE INVENTION

The foregoing and other objects which will be apparent to those having ordinary skill in the art are achieved according to the invention by providing a composition including a first component in admixture with 30 to 70 percent by volume of a second component. The first component includes about 22.0% to 36.1% by weight EPON 828, from 2.1% to 4.0% by weight EPON 834, from 0.3% to 1.4% by weight hexachlorobutadiene, from 32.1% to 52.1% calcium carbonate, from 0.5% to 1.0% zinc oxide, from 0.6% to 1.6% by weight white lead, from 0.3% to 0.5% by weight NUJOL, from 0.2% to 0.5% by weight acetic acid, from 0.9% to 2% by weight titanium dioxide, from 0.5% to 0.9% by weight barium sulphate, the percentages by weight being based on the total amount of said first component used in the experiment, which was 4.7 ounces; and the second component includes from 15.0% to 23.3% by weight of a curing agent, such as EPON V-15, from 23.0% to 61.2% calcium carbonate, from 1.5% to 3.0% by weight epichlorohydrin, from 0.5% to 3.5% by weight bisphenol-A, from 1.5% to 3.5% by weight of diacetamide, from 1.5% to 3.5% by weight aminophenol, from 0.4% to 3.5% by weight amidoaldehyde, and trace of dimethylamino antipyrine, which was also based on the total amount of said second component, 4.7 ounces. The second component has a curing agent and the polyamides shown herein, which are condensation products or dimerized fatty acids and aliphatic polyamines having free amino groups.

The main ingredient in the first component of the described combination is calcium carbonate and the other essential constituents are EPON-828, EPON-834, with a small excess of hexachlorobutadiene, titanium oxide, and barium sulphate. When the epoxy resins EPON 828 and 834 are combined with the calcium carbonate, a very fine white paste is formed. The other ingredients are combined with these principal ingredients to precipitate their interaction and to make it possible for the composition to be self-curing and thermogenetic when the second component is added.

The main ingredients in the second component are EPON V-15, bisphenol-A, epichlorohydrin, calcium carbonate, and about 12.5% polyamides.

EPON 828 is a trademark of Shell Chemical Company. It is an epoxy resin generally formed from the condensation of bis-phenol-A with epichlorohydrin. It is a liquid at room temperature, having a Gardner-Holt viscosity of 100–160 poise at 25° C and an epoxide equivalent of 185–192 grams of resin containing 1 gram-equivalent of epoxide. EPON 834 is also a trademark of Shell Chemical Company. It is a semi-solid epoxy resin at room temperature having a melting point of 35°–40° C and an epoxide equivalent of 230–280. These resins are more fully described in Shell Chemical Company Technical Publication SC:71-17, entitled "EPON Resin Esters for Surface Coatings", dated August, 1971.

EPON V-15 is a trademark of Shell Chemical Company identifying a polyamide resin formed from the condensation of a diamine with an appropriate diacid. It is a useful curing agent having an equivalent weight of about 225 grams of resin per gram equivalent of amine hydrogen. This resin is more fully described in Shell Chemical Company Technical Publication SC:71-11 entitled, "Amine-Cured EPON Resin Coatings", dated March, 1973.

NUJOL is a trademark of the Exxon Corporation for commercially available white mineral oil. The properties of this material are discussed on page 242 of the "Dictionary of Commercial Chemicals", Snell and Snell, D. Van Nostraud Company, Inc., 1962.

DETAILED DESCRIPTION OF THE INVENTION

The useful concentration ranges of the disclosed compounds in the composition described herein are illustrated in the following Table I.

TABLE I

| First Component 30–70% by volume of total composition | |
|---|---|
| | % by weight of First Component |
| EPON 828 | 22.0 – 36.1 |
| EPON 834 | 2.1 – 4.0 |
| hexachlorobutadiene | 0.3 – 1.4 |
| zinc oxide | 0.5 – 1.0 |
| white lead | 0.6 – 1.6 |
| calcium carbonate | 32.1 – 52.1 |
| titanium dioxide | 0.9 – 2.0 |
| barium sulphate | 0.5 – 0.9 |
| NUJOL | 0.3 – 0.5 |
| acetic acid | 0.2 – 0.5 |
| Second Component 30–70% by volume of total composition | |
| | % by weight of Second Component |
| EPON V-15 | 15.0 – 23.3 |
| calcium carbonate | 23.0 – 61.2 |
| epichlorohydrin | 1.5 – 3.0 |
| bisphenol-A | 0.5 – 3.5 |
| diacetamide | 1.5 – 3.5 |
| aminophenol | 1.5 – 2.0 |
| amido-aldehyde | 0.4 – 3.5 |

The following example illustrates a preferred embodiment of the present invention. A coating composition having the ingredients described in Table II was prepared by blending the particulate ingredients in a suitable container.

TABLE II

| First Component 49% by weight of total composition | | |
|---|---|---|
| | Amount (grams) | % by weight of first component |
| EPON 828 | 48.0 | 36.1 |
| EPON 834 | 5.3 | 4.0 |
| hexachlorobutadiene | 1.9 | 1.4 |
| zinc oxide | 1.3 | 1.0 |
| white lead | 2.1 | 1.6 |
| calcium carbonate | 69.4 | 52.1 |
| titanium dioxide | 2.7 | 2.0 |
| barium sulphate | 0.1 | 0.9 |
| NUJOL | 0.7 | 0.5 |

TABLE II-continued

| acetic acid | 0.7 | 0.5 |
|---|---|---|
| Second Component 51% by weight of total composition | | |
| | Amount (grams) | % by weight of second component |
| EPON V-15 | 31.0 | 23.0 |
| calcium carbonate | 81.5 | 60.5 |
| epichlorohydrin | 4.0 | 3.0 |
| bisphenol-A | 4.0 | 3.0 |
| diacetamide | 4.7 | 3.5 |
| aminophenol | 4.7 | 3.5 |
| amido-aldehyde | 0.6 | 0.4 |
| dimethylamino antipyrine | trace | |

Simple hand stirring was employed in this example. The epoxies are conveniently in soluble form, and there is normally sufficient liquids and water to meet the requirements of blending. This is true of the second component as well.

Prior to use, a portion of the second component was blended with an equal volumetric portion of the first component and mixed in a convenient manner, in this case by hand mixing with a stiff spatula. The material was orginally pasty or syrupy, but changed to a semi-solid paste in a fairly short time, 20 to 35 minutes, longer setting time resulting when more water is present. Free water rapidly disappeared and the mixture began to set up hard in about 45 minutes. The product set up, without firing, to a bisque-like finish. The hardened material was as hard and as strong as stone and was impervious to water and resistant to elevated temperatures, boiling and the like, and to changes in temperature and was eminently suitable for simulating, repairing, modification, restoration and mending of ceramic and pottery-like objects.

The following are illustrative instructions for repairing, resurfacing, modifying and restoring damages common to stoneware, ceramics, pottery and china: glaze damage to the edge of a stoneware saucer or plate or similar article, lost or missing surface chips, broken out edge chips, and flake chips. The damages discussed are by no means the only kinds of damage that can be repaired, but the discussions are indicative of basic teachings.

Glaze damage and chips replaced:
1. Place a small amount of the composition of Example I in a saucer.
2. Add tint or shade of pigment to match background of the ceramic to be mended.
3. Smooth the paste composition into the areas where it is needed. It can be handled to fill cracks, nicks, even small broken out areas. It is especially serviceable for covering over large areas that have already been prepared for repair. If the surface flake damage has bitten down slightly into the china surface below, prepare the paste using your finger or an art brush.
4. Permit the material to get semi-hard, which it will do in about 20 minutes.
5. Dampen fingers in water before material has set and smooth away excess, which reduces need for sanding and eliminates the scratching of surrounding areas of glaze.
6. Permit the material to harden. Finish will be bisque. This material will adapt itself to oxide paint decorating (china painting) and a final gloss may be added with one of the commercial spray glaze type.

Edge chip damage:
Edge chip damage is a damage that occurs when one or two pieces in the shape of a "V" or wedge are broken out of the side or lip edge of an article and a backup support of masking tape is required to hold the composition in place.

1. Apply the tape to the underside of the article to be repaired, carefully supporting the underside of the open "V" area. Reinforce with a commercial adhesive putty such as Mortite or Plasticine to hold tape firm, because it may sag when the filler or composition is laid on it. Clean the area with lacquer thinner, containing methylate. Air dry.

2. Prepare a mix of the composition and make a fairly firm paste of it by using equal parts by volume.

3. Lay in the paste using an art brush or by hand.

4. Dampen fingers in methylate or water and smooth away excess after 20 minutes or so, as the material will then be semi-hard.

5. If the damaged area is deep, apply two or three thick layers, one layer at a time.

6. Balance the article in a sand box, if necessary, and allow to dry between applications. The final application should be smoothed and the excess smoothed away by dampening the fingers in water of methylate.

7. Match and mix the final shade of paint color with the composition to match the article being mended. When dry, glaze the item, unless a bisque finish is desired. When dry, the article will be ready for final decoration of it is a pattern piece.

Surface restoration:

Where the surface of an article of pottery has eroded or become badly stained by calcareous material, this composition is especially needed and useful in restoration of the surface, as a coating.

1. Make a very firm paste mix by allowing the initial mix to stand a few minutes.

2. Assuming the full surface has been cleaned insofar as possible, and is prepared to receive the paste, apply the composition-paste in a thick layer all over the damaged surface by hand. Use water or methylate to smooth as you go, until you have exactly the smoothness needed to coat, and blend in with the unrestored surfaces of the article.

3. The paste may be combined with any oil base oxide paint to obtain the tint desired. Mix well with a spatula in a circular motion. The resulting compound will have adhesiveness sufficient for it to hold to surface to which applied. It will not run or drip. It will also cover all erosion and stains, surface flaking and the like. When the compound has hardened, decorate and glaze.

Conventional pigments, fillers, texturizing agents, and the like, may also be added to either or both components of the disclosed composition in amounts needed for a desired pigmentation or texture effect, but will generally be used in an amount of not more than 30 percent by weight of the composition. It will be clear to those having ordinary skill in the art that these other materials can be added to impart color, texture and strength.

I claim:

1. A composition capable of hardening into a hard, pottery-like material and comprising a mixture of a first component which comprises:
   22.0–36.1% by weight of an epoxy resin having a viscosity of 100–160 poise and an epoxide equivalent of 185–192;
   2.1–4.0% by weight of a semi-solid epoxy resin having an epoxide equivalent of 230–280;
   0.3–1.4% by weight of hexachlorobutadiene;
   0.5–1.0% by weight of zinc oxide;
   0.6–1.6% by weight of white lead;
   32.1–52.1% by weight of calcium carbonate;
   0.9–2.0% by weight of titanium dioxide;
   0.5–0.9% by weight of barium sulphate;
   0.3–0.5% by weight of mineral oil; and
   0.2–0.5% by weight of acetic acid; and
a second component which comprises:
   15.0–23.3% by weight of a polyamide resin having an equivalent weight of 225 grams per amine hydrogen;
   23.0–61.2% by weight of calcium carbonate;
   1.5–3.0% by weight of epichlorohydrin;
   0.5–3.5% by weight of bisphenol-A;
   1.5–3.5% by weight of diacetamide;
   1.5–2.0% by weight of aminophenol; and
   0.4–3.5% by weight of amido-aldehyde.

2. The composition of claim 1 wherein the second component is present in an amount of from 30 to 70 volume percent.

3. The composition of claim 1 wherein the first component comprises:
   36.1% by weight of an epoxy resin having a viscosity of 100–160 poise and an epoxide equivalent of 185–192;
   4.0% by weight of a semi-solid epoxy resin having an epoxide equivalent of 230–280;
   1.4% by weight of hexachlonobutadiene;
   1.0% by weight of zinc oxide;
   1.6% by weight of white lead;
   52.1% by weight of calcium carbonate;
   2.0% by weight of titanium dioxide;
   0.9% by weight of barium sulphate;
   0.5% by weight of mineral oil; and
   0.5% by weight of acetic acid;
and the second component comprises:
   23.0% by weight of a polyamide resin having an equivalent weight of 225 grams per amine hydrogen;
   60.5% by weight of calcium carbonate;
   3.0% by weight of epichlorohydrin;
   3.0% by weight of bisphenol-A;
   3.5% by weight of diacetamide;
   3.5% by weight of aminophenol; and
   0.4% by weight of amido-aldehyde.

* * * * *